(12) United States Patent
Encrenaz et al.

(10) Patent No.: US 10,747,486 B2
(45) Date of Patent: Aug. 18, 2020

(54) WEB SERVICE FOR PRINTER COLOR MATCHING VIA PROFILE MAPPING DEVICE-INDEPENDENT COLOR VALUES OF REFERENCE DEVICE TO DEVICE-SPECIFIC COLOR VALUES OF PRODUCTION DEVICE

(71) Applicant: Hewlett-Packard Development Company, L.P., Houston, TX (US)

(72) Inventors: Michel Georges Encrenaz, Sant Cugat del Valles (ES); Josep Abad Peiro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,957

(22) PCT Filed: Jul. 28, 2016

(86) PCT No.: PCT/US2016/044421
§ 371 (c)(1),
(2) Date: Oct. 31, 2018

(87) PCT Pub. No.: WO2018/022058
PCT Pub. Date: Feb. 1, 2018

(65) Prior Publication Data
US 2019/0146737 A1 May 16, 2019

(51) Int. Cl.
*G06F 3/12* (2006.01)
*H04N 1/60* (2006.01)
*H04N 1/00* (2006.01)

(52) U.S. Cl.
CPC .......... *G06F 3/1265* (2013.01); *G06F 3/1208* (2013.01); *H04N 1/00244* (2013.01);
(Continued)

(58) Field of Classification Search
CPC . G06F 3/1265; G06F 3/1208; H04N 1/00244; H04N 1/6066; H04N 1/6052; H04N 1/60
See application file for complete search history.

(56) References Cited

U.S. PATENT DOCUMENTS 7,161,710 B1  1/2007  MacLeod
8,314,979 B2  11/2012  Mestha et al.
(Continued)

OTHER PUBLICATIONS

Yu-Ju, W., et al., Color Matching Capability of Digital Printers, Ingenta Connect, Jan. 1, 2007, 2 pages.—Abstract Only—.

*Primary Examiner* — Christopher Wait
(74) *Attorney, Agent, or Firm* — HP Inc. Patent Department

(57) ABSTRACT

Web server based color management hosted by a web server is provided enabling a production device to produce a print job with a similar color appearance as a reference device. The web server receives a production device color management profile and a reference device color management profile. The web server creates an output color management profile based on the color management profile of the production device and the color management profile of the reference device. The output color management profile maps device-independent color values associated in the color management profile of the reference device to device-specific color values for colors reproducible by the production device.

14 Claims, 9 Drawing Sheets

(52) U.S. Cl.
CPC ............ *H04N 1/60* (2013.01); *H04N 1/6052* (2013.01); *H04N 1/6066* (2013.01)

(56) References Cited

U.S. PATENT DOCUMENTS

| | | |
|---|---|---|
| 8,351,074 B2 | 1/2013 | Naito et al. |
| 8,570,626 B2 | 10/2013 | Arregui et al. |
| 9,001,380 B2 | 4/2015 | Oh et al. |
| 2002/0140985 A1 | 10/2002 | Hudson |
| 2006/0170993 A1 | 8/2006 | Jacob |
| 2009/0310152 A1* | 12/2009 | Roulland ............... H04N 1/603 358/1.9 |
| 2014/0307277 A1* | 10/2014 | Miyahara ........... G06K 15/1878 358/1.9 |

\* cited by examiner

WEB SERVICE FOR PRINTER COLOR MATCHING VIA PROFILE MAPPING DEVICE-INDEPENDENT COLOR VALUES OF REFERENCE DEVICE TO DEVICE-SPECIFIC COLOR VALUES OF PRODUCTION DEVICE

BACKGROUND

Color management is employed in the field of image capturing, processing and reproduction. Color management profiles map device-specific color values to/from a device-independent color space. In order to reproduce an image in a similar color representation as captured, a profile of the capturing device is used to convert the image to the device-independent color space and a profile of the output device is then used to convert the image to the device-specific color space of the output device.

DETAILED DESCRIPTION

Figure 1:
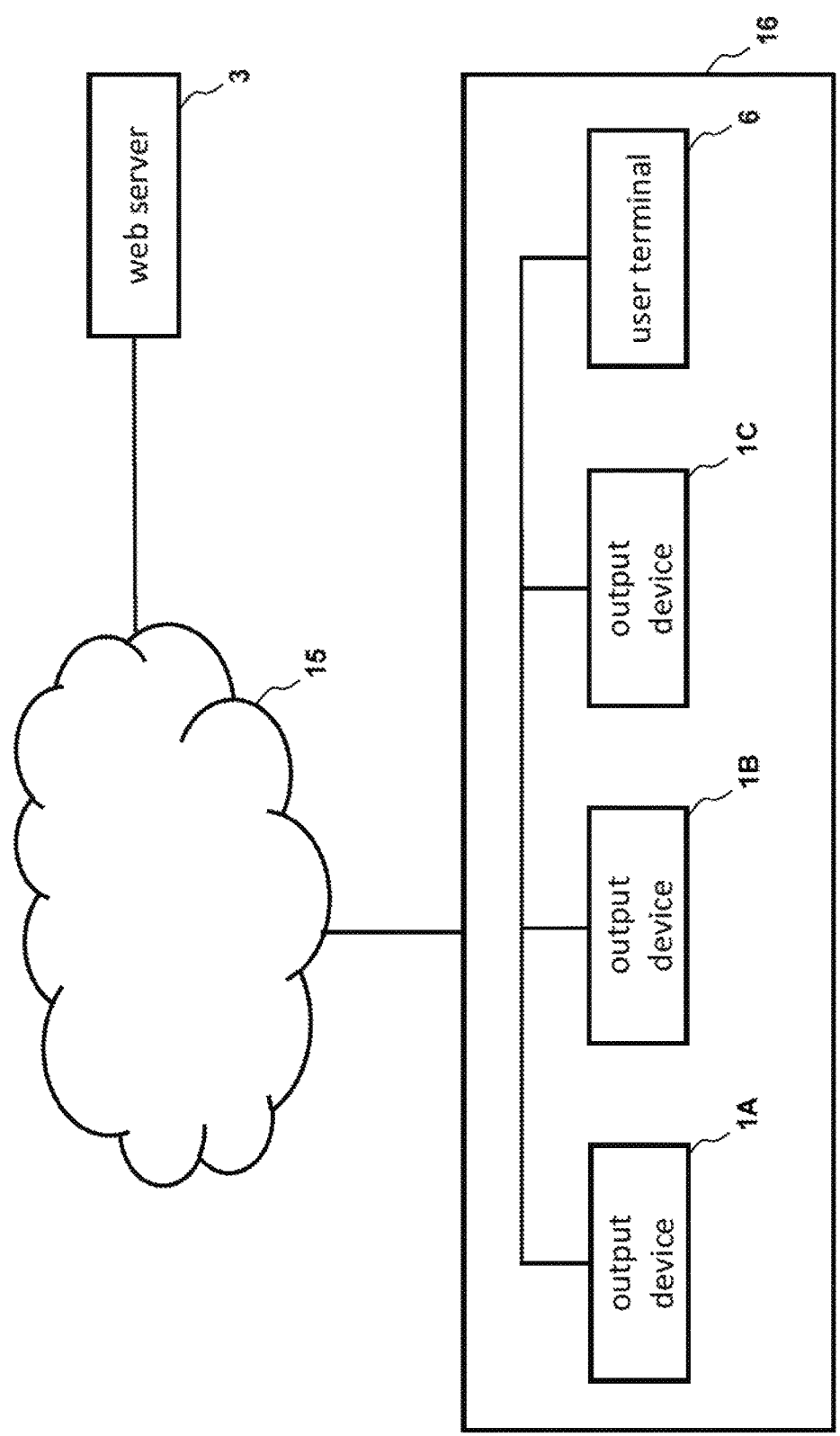
FIG. 1 illustrates an example high-level architecture of an environment for executing the methodologies described herein.

Colors are represented by image processing devices in a generally inconsistent manner. Every image processing device model or type, be it an input device such as a scanner or a camera or be it an output device such as a monitor or a printer, has its own device-specific color representation. Different input device types have different dynamic ranges of brightness levels, while different types of output devices have different ranges of colors and tones they can reproduce (gamut, device-specific color space). For example, a first output device may be able reproduce a first specific color subset, e.g. colors ABCD, while a second device can reproduce colors ACDE.

In addition, the definitions of processible colors are device-type-specific, either. The colors processible by a device are encoded by device-specific color values using color models by RGB or CMYK. Thus, the same set of RGB or CMYK numbers generally stands for different colors on different devices or, in the case of printers, for different target print material. Hence, the same RGB or CMYK color values are printed differently by different printer models.

Generally, an intermediate standard color definition layer (often referred to as PCS, profile connection space) is introduced which defines colors in a device-independent manner by using a device-independent color model such as CIE LAB, CIE XYZ or other known color models defined by CIE (International Commission on Illumination). Device profiles translate device-specific color definitions into/from the device-independent PCS color space. To this end, a profile generally contains two set of values, namely the device-specific color values (e.g. in RGB or CMYK color model) which are mapped to or associated with corresponding device-independent color values in the PCS (e.g. using the CIE LAB color model). In this way, a profile attributes a meaning to device-specific RGB or CMYK color values and thus describes the color reproduction characteristics of the device.

There are different types of profiles. Pure input profiles mapping device-specific color values of an input device to PCS color values, also referred to as backwards transform. Output profile map PCS color values to device-specific color values of an output device (forward transform) and also include the backwards transform definitions. CIE LAB-based profiles store the color value association in a lookup table, while CIE XYZ-based profiles store the color value association in matrices. An example of a standard profile format has been issued by the ICC (International Color Consortium), namely the ICC Profile Format Specification which describes an open profile format that all vendors can use. Profiles according to this specification are referred to as ICC profiles herein.

Profile-based color management allows for a more consistent image processing. For example, an image generated by an input device such as a scanner can first be transformed into the PCS by using the device profile of the scanner and then be transformed to the color space of an output device such as a printer by using the device profile of the printer, in order to reproduce the image with a similar color appearance.

However, there are still use cases which are not adequately addressed by known color management processes. For example, a printing shop might have to reproduce a large number of copies (e.g. 10,000 or more) of a particular advertisement poster or of a complete magazine with consistent color representation, due to timing requirements, on a number of different printer models. Hence, a convenient solution for printing images with similar color representation on a number of heterogeneous printers is sought.

Web server based color management may enable a production device to produce a print job with similar color appearance as a reference device, as specified by the independent claims.

According to one aspect, a method is performed by the web server. According to another aspect, a web server arranged to provide the functionality of providing the color management is provided. According to a still further aspect, a computer program product enabling a web server to perform the color management is provided.

The web server hosts a web-service which implements the web server based color management. The web server receives a color management profile of the production device which associates device-independent color values and device-specific color values for colors that are reproducible by the production device. The web server also receives a color management profile of the reference device that likewise associates device-independent color values and device-specific color values for colors that are reproducible by the reference device. Based on both, the color management profile of the production device and the color management profile of the reference device, the web server creates an output color management profile. The output color management profile maps device-independent color values that are associated in the color management profile of the reference device to device-specific color values for colors reproducible by the production device. Finally, the web server returns the output color management profile.

An environment for performing the web server based color management is shown by FIG. 1. A local network 16, e.g. the network of the print shop, hosts a number of output devices 1A, 1B, 1C. The output devices 1A, 1B, 1C may be printers of different types or models. Any of the output devices 1A. 1B. 1C may be the production device introduced above. Generally, a production device as used herein is any device that is capable of reproducing an image on a medium, such as an offset printer, an inkjet printer, a laser printer, a printing press, a photocopier, etc.

The local network 16 also includes at least one user terminal 6 for making use of the webservice offered by the web server 3. The user terminal may be a computer, a laptop, a tablet computer, a smartphone, etc. running a client application such as an Internet browser in order to access the webservice hosted by the web server 3.

The local network is communicatively coupled to the web server 3 over a network 15 such as the Internet or any other wide area network. In some examples, the web server 3 is physically located in the local network 16, e.g. on the user terminal 6 or any other dedicated hosts. In still other examples, the web server 3 is a virtual node of the local network 16, but is physically located remote from the local network 16. For example, the print shop may be a chain with a central office and a plurality of branch offices. The web server 3 may then be physically located in the central office, while all local networks in all the offices form a single virtual local network (VLAN).

One of the output devices 1A, 1B, 1C which is not the production device may serve as the reference device. For example, in FIG. 1, output device 1A may be the reference device and output device 1B may be designated to be the production device. In this case, the web server based color management will enable the output device 1B (i.e. production device) to print an image with a substantially similar color appearance as if the same image would be printed on the output device 1A (i.e. reference device).

Generally, the reference device sets the reference for the color representation of the image to be reproduced by the print job. The reference device is either a real specific device, such as output device 1A, or a virtual device which is not actually and physically located in the local network 16, such as a device specified by characteristic data or a standard reference profile of a standard body. In either case, the color representation generated by the reference device is defined by the color management profile of the reference device, such as an ICC profile mapping device-specific color representation of the reference device to the PCS. The color management profile of the reference device is also referred to as reference device profile hereinafter. Generally, a color management profile as used herein is a definition for translating device-specific color values into/from the device-independent PCS color space, as introduced above.

In the framework described herein, the print job is to be executed on the production device. Hence, the production device is the device designated to actually reproduce the image (in addition, the image may also be reproduced on the reference device if the reference device is a real physical device). Again, the color representation generated by the production device is defined by the color management profile of the production device, also referred to as production device profile hereinafter. Again, in some examples, the production device profile is an ICC profile associating the color representation effected by the production device with corresponding color values in the PCS.

Figure 2:
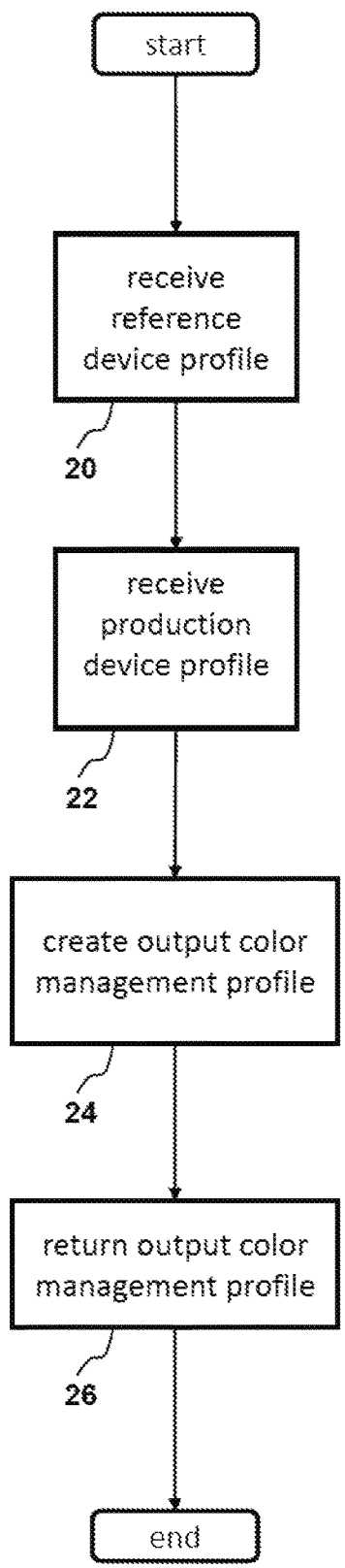
FIG. 2 shows a flow chart of example activities described herein.

In order to enable the production device to reproduce the image being object of the print job with a substantially similar color appearance as the reference device, the web server 3 generates a third color management profile. To this end, the web server 3 receives the reference device profile at 20 (FIG. 2) and the production device profile at 22. In some examples, both profiles are received from the user terminal 6. The web server 3 may receive either profile first or may receive both profiles at the same time, e.g. with the same message.

The web server 3 then, at 24, creates the third profile, referred to as output color management profile hereinafter. In general, the output color management profile adapts the color reproduction of the production device to the (potentially differing) color reproduction of the production profile. More specifically, the output color management profile maps device-independent color values that are associated in the reference device profile to production-device-specific color values for colors reproducible by the production device. This has the effect that the production device reproduces the image being object of the print job with substantially the same color representation as the reference device, if the output color management profile is applied when sending the print job with the image to the production device.

Finally, at 26, the output color management profile is returned to the inquiring entity such as the user terminal 6. Subsequently, the output color management profile may be used for executing print jobs on the production device.

In this way, customers such as print shops are offered an easy-to-use color management facilitating consistent image reproduction such as reproduction of the same image on a heterogeneous fleet of production devices. Knowledge of the color representation details of the production device is not required. Generation of the output color management profile as well as application of the generated output color management profile may also be automated by using the webservice offered by the web server 3, for example by embedding the process of generating the output color management profile into the process of instructing the production device to execute the print job. Moreover, generation of the output color management profile is universally accessible from any client station which is arranged to access the Internet and the web server 3.

The reference device profile, the production device profile and the output color management profile may be profiles of the same standard format, such as ICC profiles. Any currently available format as well as future standards are encompassed. In some examples, the color management webservice implemented by the web server 3 also supports profiles of different standards. In this case, the web server 3 performs a profile format translation of the reference device profile and/or the production device profile into the profile format used by the PCS and/or a profile format translation from the PCS into the profile format of the output color management profile.

Generally, generating the output color management profile prerequisites the existence of the reference device profile and the production device profile. Nowadays, these device profiles are regularly provided by the manufacturers of the output devices. If e.g. the production device profile is not available yet, it is created in some examples before accessing the webservice. Profile creation e.g. follows a profiling workflow including measurement, calibration and control processes.

The webservice hosted by the web server 3 may be implemented by using webservice protocols such as Simple Object Access Protocol (SOAP), JavaScript Object Notation (JSON), Asynchronous JavaScript and XML (AJAX), Asynchronous JavaScript and JSON (AJAJ) and/or WebSockets.

The webservice is accessed e.g. by the user terminal 6 via the Hypertext Transfer Protocol (HTTP, HTTP/2). In some examples, secure communication is employed by using HTTP Secure (HTTPS). The webservice may be implemented on the basis of existing webservice frameworks or platforms.

Figure 3:
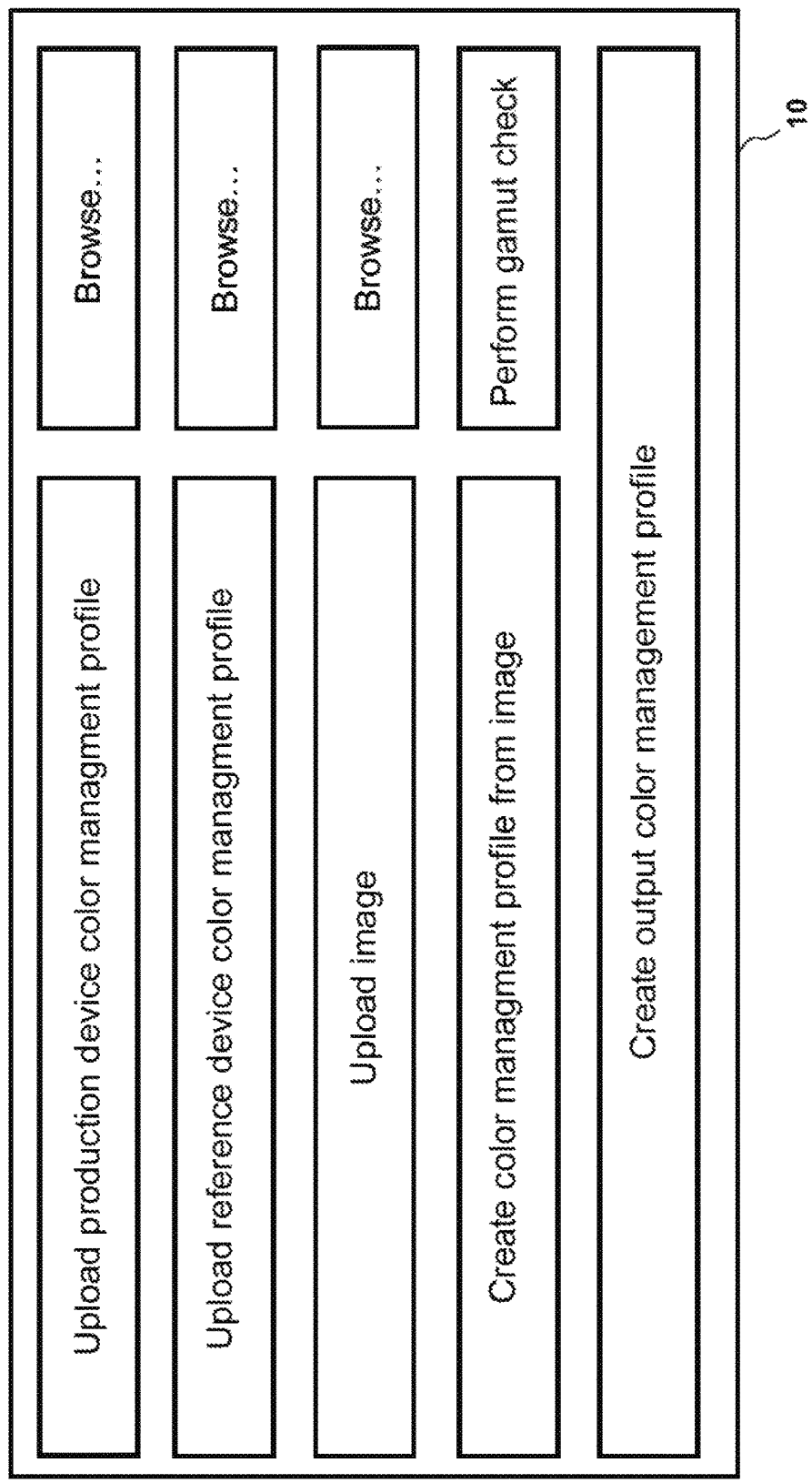
FIG. 3 is an example of a graphical user interface (GUI) provided by the web server.

In some examples, the webservice offered by the web server 3 is accessed by using a graphical user interface (GUI). An example of a GUI is given by FIG. 3. The GUI 10 may be displayed by a web browser running on the user terminal 6. The GUI 10 enables a user to browse for the production device profile and for the reference device profile. Both profiles may thus be stored at any location on the user terminal 6 or remote from the user terminal 6 at another host in the local network 16 or at any location remote from the local network 16. In the example of FIG. 3, both profiles are uploaded and transmitted separately to the web server 3 by pressing the respective upload button.

In the example of FIG. 3, the GUI 10 enables the user to browse and upload an image which is to be reproduced by the production device. As explained further below, the image is used in some examples to perform an image-related gamut check when or before generating the output color management profile. The gamut check is performed by the web server 3 e.g. in response to pressing the perform gamut check button.

Further on, the GUI 10 includes a button to trigger the generation of the output color management profile. In response to pressing this button, the web server 3 generates the output color management profile and returns the output color management profile to the user terminal 6. In some examples, the user is prompted to specify the storage location of the output color management profile. In other examples, the output color management profile is stored automatically, e.g. at the storage location (e.g. a folder) of the production device profile.

In some examples, the output color management profile encompasses the complete color space of the reference device. In other words, all colors being reproducible by the reference device and specified by the reference device profile are translated into device-specific color values of the production device which are included in the output color management profile. The generated output color management profile is thus image-independent and therefore generally suitable for executing any print job on the production device.

A portion of the color space of the reference device may be transferred to the output color management profile. For example, only colors present in a particular image which is object of the print job are specified in the output color management profile. Hence, in these examples, the output color management profile is an image-specific profile which is applied to reproduce that specific image. An image-specific profile will generally be more compact than a profile encompassing the complete color space of the reference device.

As mentioned above, in some examples, the output color management profile is an ICC profile which is, for example, formatted in accordance with specification "ICC.1:2001-12 File Format for Color Profiles (Version 4.0.0)". This specification and other ICC profile specifications defines, among others, the following tags:

AToB0: defines a color transform from device to PCS
BToA0: defines a color transform from PCS to device In these examples, the output color management profile may be created as follows (FIG. 4): At 24A, all BtoA0 tags of the output color management profile are populated with the color values of the corresponding BtoA0 tags in the production device profile as far as the reference device profile contains BtoA0 tags for the same device-independent (e.g. CIE LAB) values. In other words, as far as both, the reference device profile and the production device profile specify respective device-specific color values for the same device-independent color values of the PCS, the output color management profile is identical with the production device profile. BtoA0 tags for device-independent color values not being defined by the reference device profile are left empty in the output color management profile, even if the production device profile defines corresponding BtoA0 tags.

In some examples, the web service hosted by the web server 3 is arranged to deal with the situation that the gamut of the reference device includes colors which cannot be reproduced by the production device, i.e. the reference device profile specifies BtoA0 tags for device-independent color values that are not associated to device-specific color values by the production device profile. In these examples, at 24B in FIG. 4, the web server 3 perform an out-of-gamut mapping when generating the output color management profile. The out-of-gamut mapping maps device-independent color values which are inside the gamut of the reference device, but outside the gamut of the production device, to device-specific color values inside the gamut of the production device. The corresponding BtoA0 tags in the output color management profile are populated with the values resulting from the out-of-gamut mapping. The out-of-gamut mapping is based e.g. on rendering intents according to the ICC specifications, by existing color management engines such as LittleCMS.

In some examples, the web server 3 performs an abstract gamut check (40 in FIG. 4) before actually completing the generation of the output color management profile and before potentially performing the out-of-gamut mapping. In these examples, the web server 3 is either arranged to perform the abstract gamut check upon a specific request by a user (which the user can trigger e.g. by pressing the "Perform gamut check" button shown in FIG. 3) and/or automatically without explicit user request. In further examples, the web server 3 performs the abstract gamut check in the course of generating the output color management profile.

Figure 4:
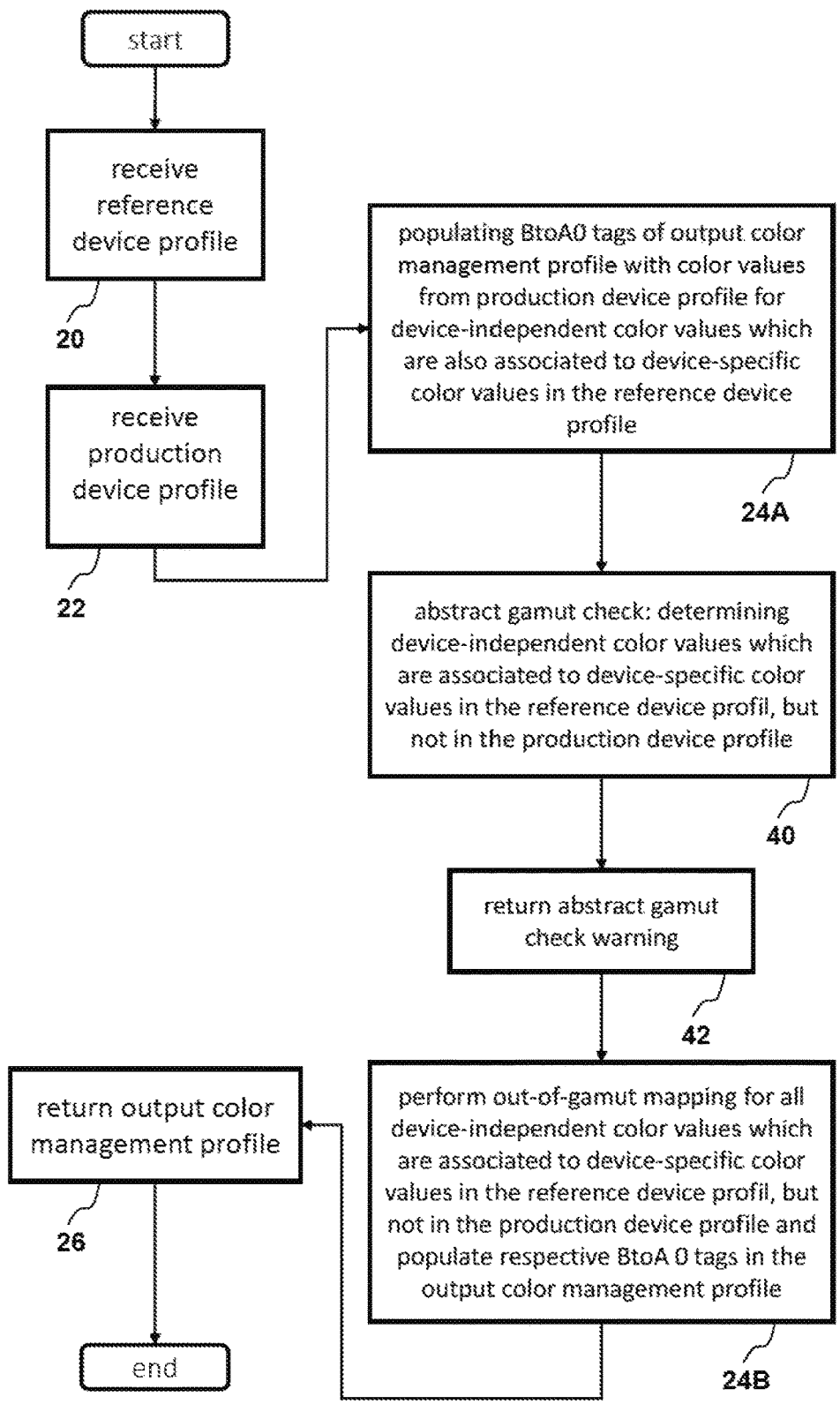
FIGS. 4 and 5 show example flows of the activities described herein.

In both variants, the web server 3, at 40 in FIG. 4, compares the reference device profile and the production device profile and determines whether and to which extent the reference device profile defines device-specific color values for device-independent color values in the PCS which are not represented in the production device profile. In response to determining that such device-independent color values exist in the reference device profile or in response to determining that the number of these color values or the percentage of these color values on the overall device-independent color values specified by the reference device profile exceeds a given threshold, the web server 3, at 42, returns an out-of-gamut warning to the user.

This gamut check is abstract as the gamut check does not relate to a particular image to be printed on the production device. The abstract gamut check examines to which extent the future output color management profile will contain device-specific values (e.g. BtoA0 tags) that result from the out-of-gamut mapping explained above which might have an impact on the color appearance similarity of the reproduction of a particular image on the production device, depending on the colors actually present in the image. If the image contains mostly colors that are inside the gamut of the production device, i.e. already specified in the production device profile, the impact might be negligible. If, on the other hand, the image contains colors outside the gamut of the production device to a higher extent, the impact might be significant. The out-of-gamut warning of the abstract out-of-gamut check indicates to the user that the gamut of the production device does not completely encompass the gamut of the reference device. The user may then take an appropriate correction activity such as selecting a different production device, reconfigure the chosen production device such as adopt a higher available printing fluid limit, etc.

In some examples (FIG. 5), the web server 3 performs an image-related gamut check. In order to facilitate the image-related gamut check, the user is enabled to upload the image to the web service 3, e.g. by browsing the image stored e.g. on the user terminal 6 or remotely and pressing the "Upload image" button shown in FIG. 3. The web server 3 performs the image-related gamut check upon a specific request by a user (which the user can likewise trigger e.g. by pressing the "Perform gamut check" button shown in FIG. 3 after the image has been uploaded to the web server 3) and/or automatically without explicit user request.

The image-related gamut check determines to which extent the out-of-gamut portion of the output color management profile resulting from the out-of-gamut mapping described above is actually relevant for the uploaded image. This depends on the colors of the image. Again, as already mentioned above, if the image contains mostly colors that are inside the gamut of the production device, i.e. already specified in the production device profile, the impact might be negligible. In this case, the image printed by the production device will look very similar to a hypothetical or real print-out by the reference device. If, on the other hand, the image contains colors outside the gamut of the production device to a higher extent, the impact might be more significant. In this case, printing the image on the production device will not preserve all colors that would be reproduced by the reference device. The colors of the reference device which are outside the gamut of the production device will be replaced by colors within the gamut of the production device (resulting from the out-of-gamut mapping performed during generation of the output color management profile as explained above). Hence, the image printed by the production device might look quite differently from a hypothetical or real print-out by the target device. Again, the image-related gamut check generates and returns, at 52, a warning message to the user indicating that e.g. a given threshold for the out-of-gamut colors has been exceeded for that particular image. The user is then in the position to take appropriate correction measures as mentioned above.

Figure 5:
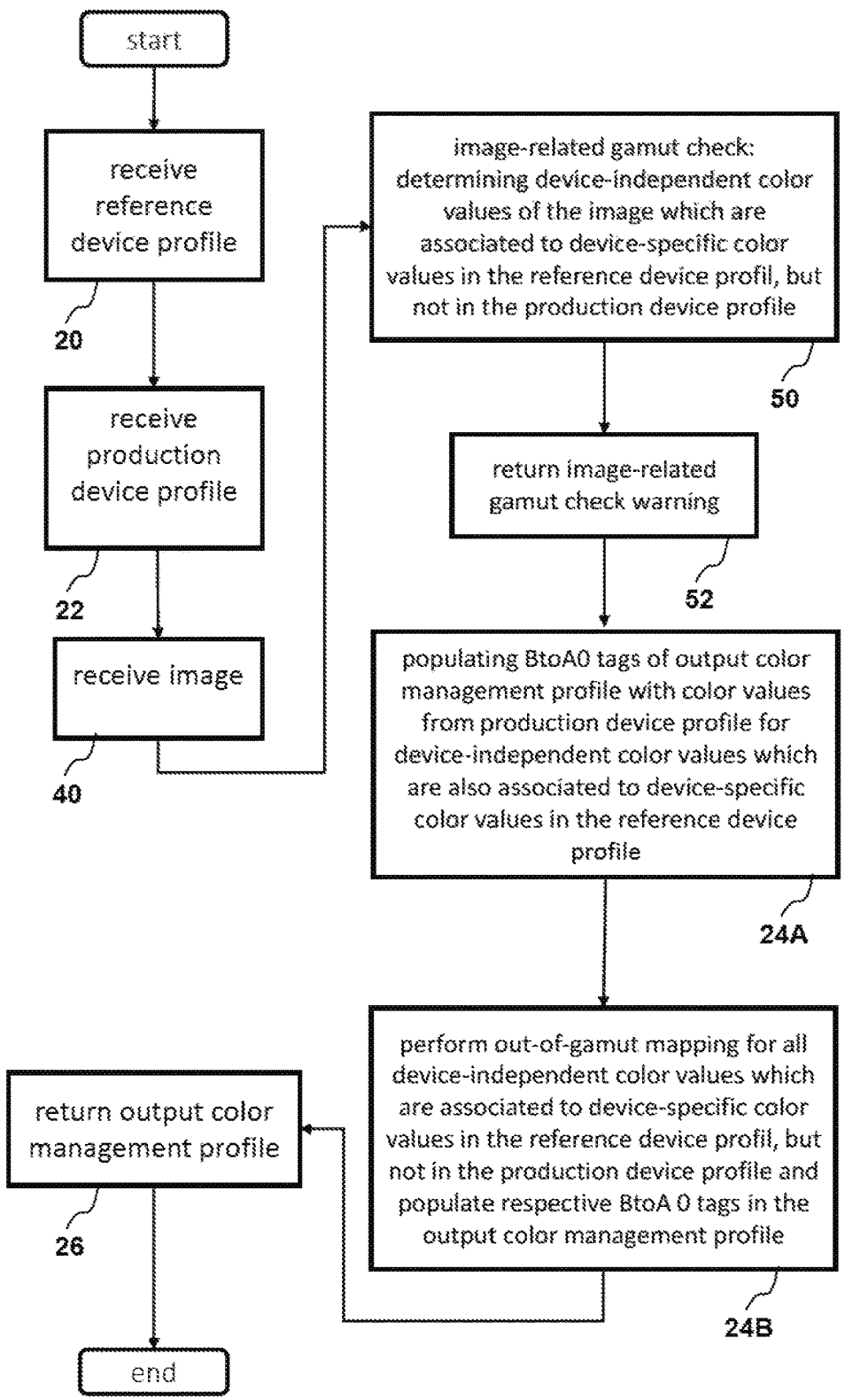

In some examples, the web server 3 performs the image-related gamut check as described above on the basis of the reference device profile and the production device profile, before actually generating the output color management profile (FIG. 5). The user can then decide on the basis of the outcome of the gamut check whether or not he wants to have the output color management profile to be generated. In other examples, the web server 3 performs the image-related gamut check on the basis of the output color management profile, after the output color management profile is generated. In these examples, the output color management profile includes additional proprietary data indicating which color values (e.g. BtoA tags) are within the gamut of the production device and which color values are outside the gamut of the production device and have been resulted from the out-of-gamut mapping as explained above.

As already briefly mentioned above, in some examples, the reference device is not a real output device which is physically present and available for executing the print job, but is a virtual device which is specified by a standard ICC profile available through a standardization body. For example, the reference device may be defined by an ICC profile according to an ECI recommendation (European Color Initiative), e.g. based on characterizing data by Fogra®. According to another example, the reference device is specified by an ICC profile according to color characterization by GRACol®.

Figure 6:
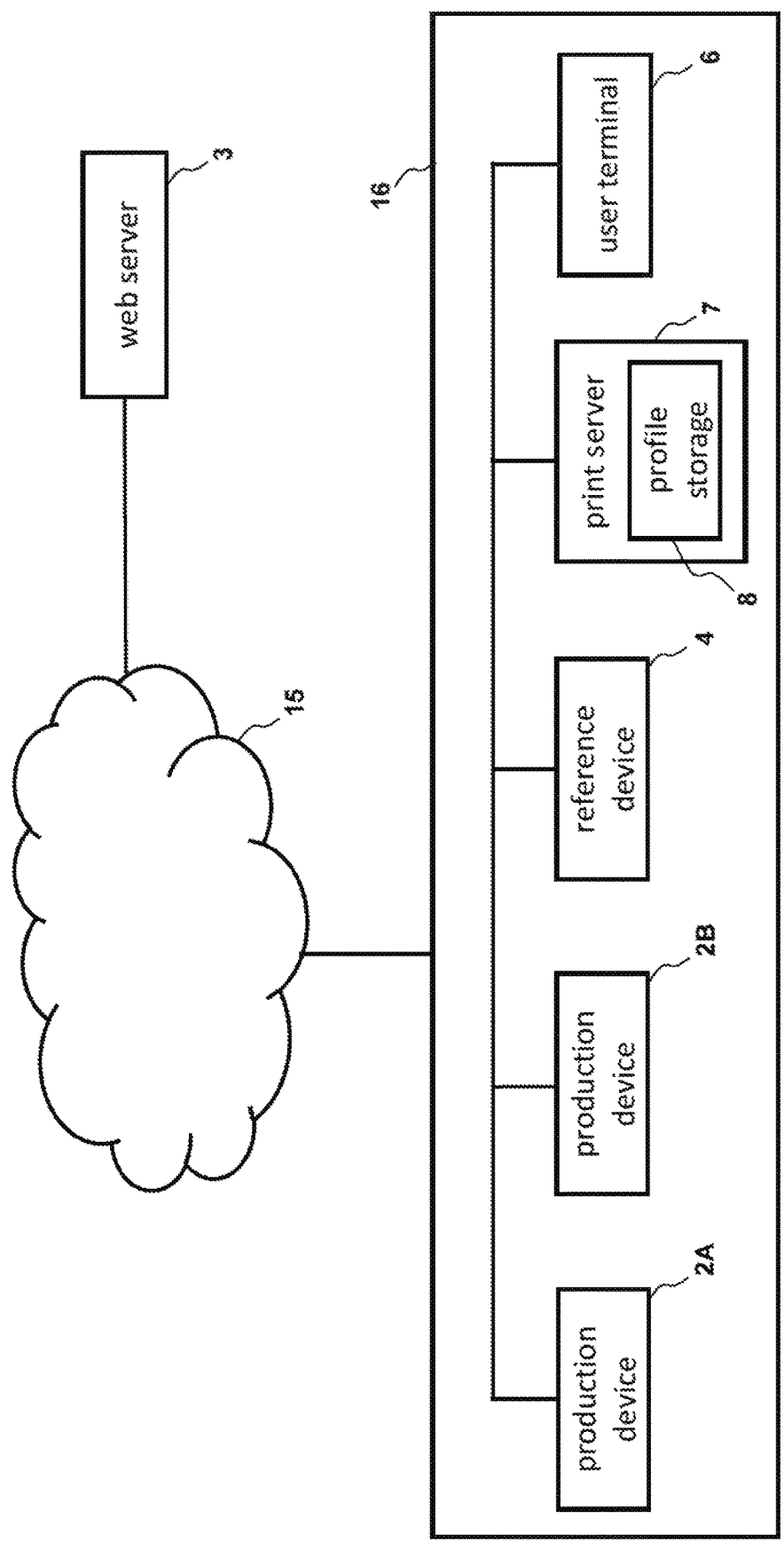
FIGS. 6 and 7 depict more architecture examples.

FIG. 6 shows a more specific example of an environment for performing the webserver based color management as described herein. Similar to FIG. 1, the web server 3 and the local network 16 are connected via the network 15. The local network 16 includes two production devices 2A, 2B, e.g. two printers of different types. Moreover, the reference device 4 is an actual device that is located in the local network 16 as well. In addition, the local network 16 includes a print server 7 for controlling the production devices 2A, 2B and the reference device 4. The color management profiles of the output devices present in the local network 16 are stored in the profile storage 8 of the print server 7.

In the example of FIG. 6, the webservice is utilized in order to print an image with similar color appearance on both, the reference device 4 and the production device 2A. The user uploads the reference device profile and the production device profile of the production device 2A to the web server 3. To this end, he operates the GUI 10 on the user terminal 6 (FIG. 3) to first select the reference device profile stored in the profile storage 8 and then to select the production device profile stored in the profile storage 8 as well. Both profiles are then transmitted to the web server 3 which performs the output color management profile generation including the abstract gamut check as described above.

The user may also decide to browse and upload the image to be reproduced on the reference device 4 and on the production device 2B to the web server 3 and to make the web server 3 to perform the image-related gamut check as described above. The web server 3 then returns the generated output color management profile to the user profile which may then be stored in the profile storage 8 of the print server 7. When instructing the production device 2B to print the image, the print server 7 utilizes the output color management profile generated by the web server 3 in order to reproduce the image with substantially the same color appearance as produced by the reference device 4.

The same methodologies apply if the production device 2B is to be enabled to reproduce the image with similar color appearance as the reference device 4. If the production device 2B is a printer of the same type as production device 2A, the print job is executed by production device 2B by using the same output color management profile as generated for production device 2A, as both production devices 2A and 2B have the same color reproduction characteristics. If, on the other hand, production device 2B is of a different type than production device 2A, a further output color management profile is generated by using the web server 3 in the same manner as the output color management profile for production device 2A is generated.

Figure 7:
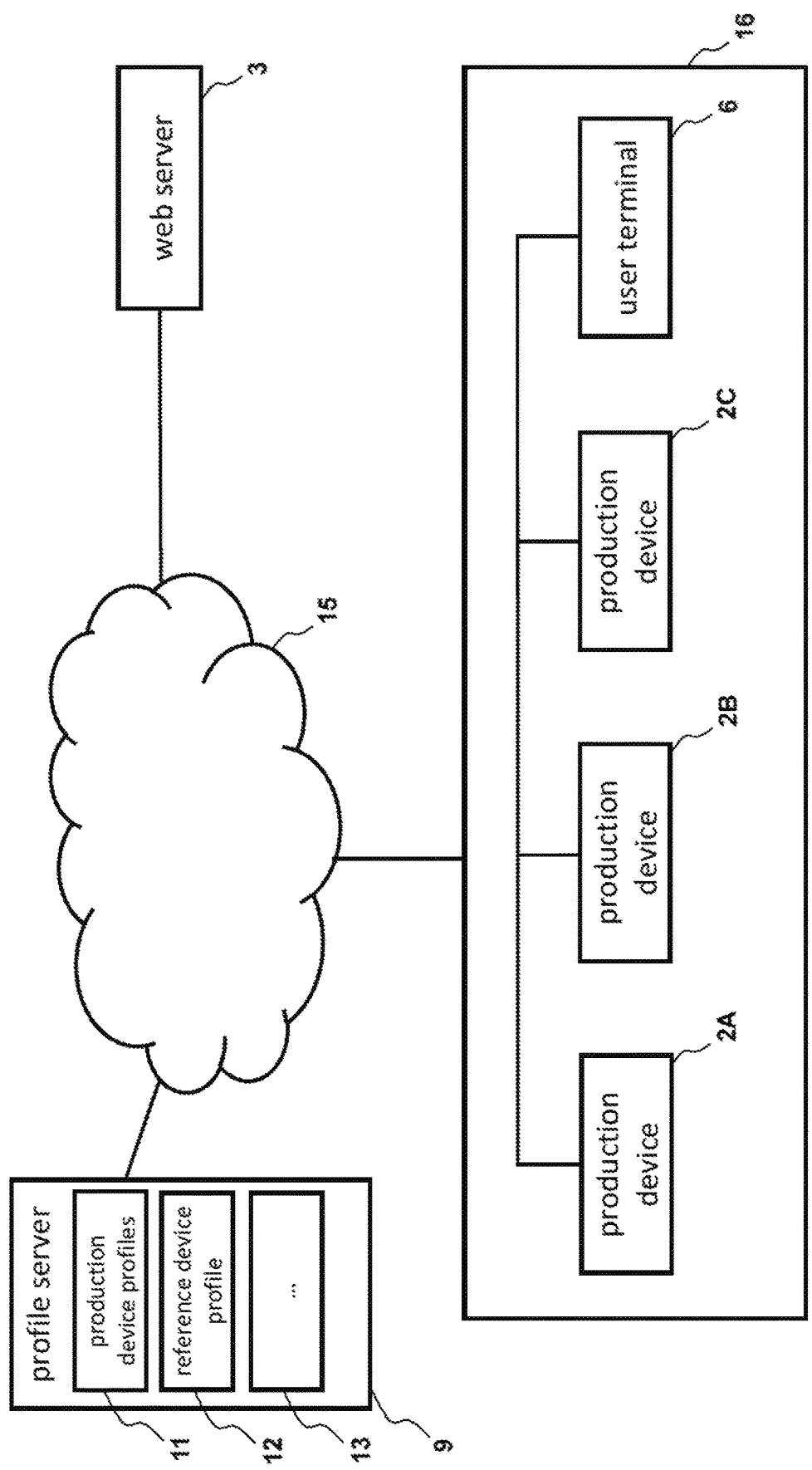

A further example of an environment for performing the webserver based color management is shown by FIG. 7. Again, the local network 16 includes a number of production devices 2A, 2B, 2C of different types as well as the user terminal 6. Different from the example of FIG. 6, the reference device is here a virtual device which is characterized by a standard reference device profile 12. In the example of FIG. 7, the reference device profile 12 and also the production device profiles 11 are stored remotely from the local network 16 on a profile server 9. In other examples, the profile server 9 hosts the reference device profile 12 (and potentially other standard device profiles 13 as well), but the production device profiles are stored locally on a print server within the local network 16, similar to the example of FIG. 6. In some examples, the profile server 9 is co-located with the web server 3.

In order to generate the output color management profile, the user uploads the production device profile 11 of the respective production device 2A, 2B, 2C as well as the reference device profile 12 from the profile server 9 to the web server 3. Selection and upload is performed via the GUI 10 display via the user terminal 6 as already explained above. The web server 3 generates the output color management profile in the same manner as explained above and returns the output color management profile to the user terminal 6 for applying the output color management profile for the print job to reproduce the image on one or more of the production devices 2A, 2B, 2C. The output color management profile generated by the web server may be stored on the profile server 9.

Figure 8:
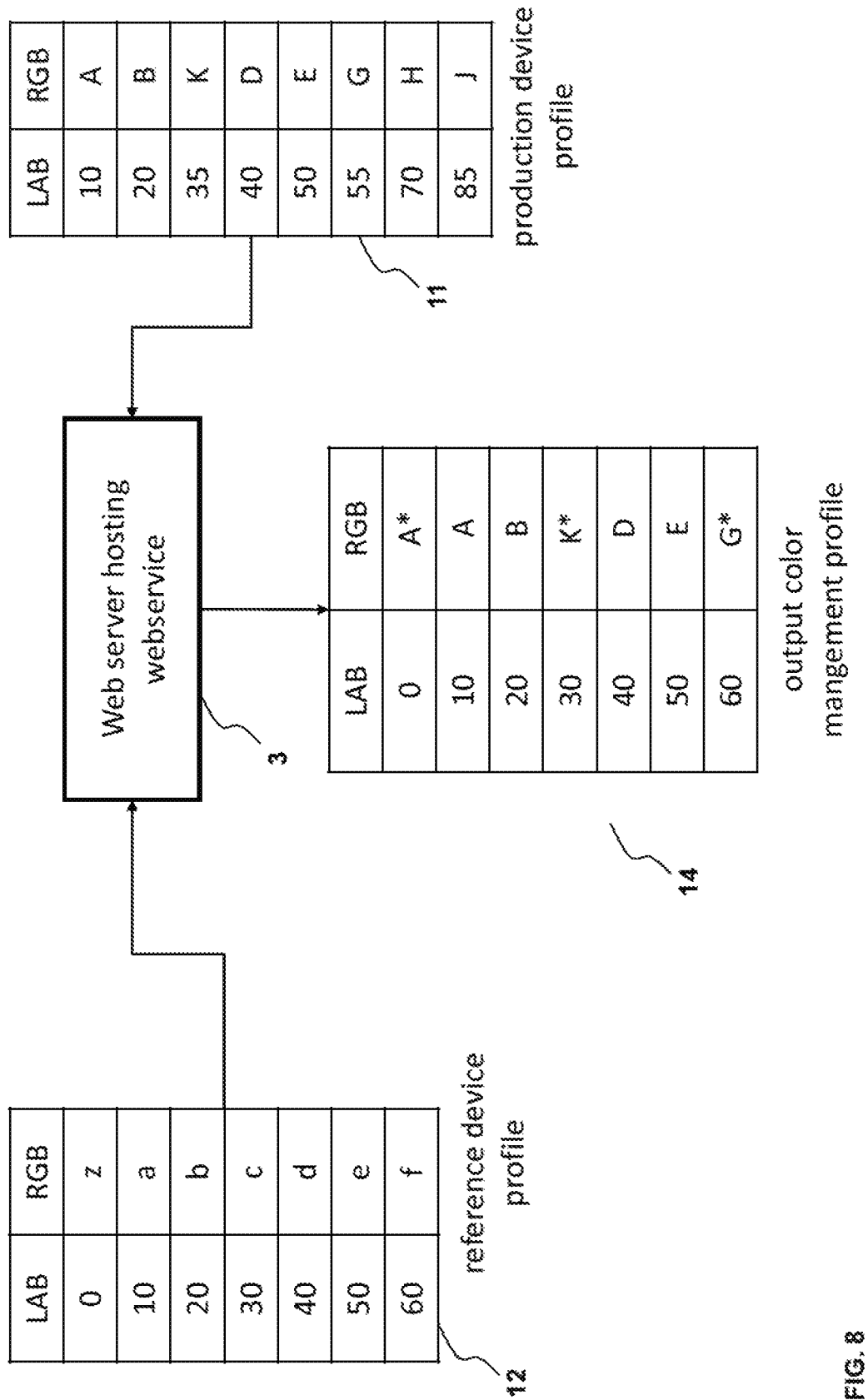
FIG. 8 illustrates an example of the output profile generation.

An example (simplified for reasons of illustration) of generating an output color management profile is given by FIG. 8. The reference device profile 12 specifies a number of device-specific color values in the RGB color model (z, a, b, c, d, e, f) which are associated with respective device-independent LAB color values in the PCS (5, 10, 20, 30, 40, 50, 60). Likewise, the production device profile specifies a number of device-specific color values in the RGB color model (A, B, K, D, E, G, H, J) which are associated with respective device-independent LAB color values in the PCS (10, 20, 35, 40, 50, 55, 70, 85).

Comparing both device profiles yields that some device-independent LAB color values are associated with respective device-specific RGB values in both profiles: both profiles contain device-specific RGB color values for the LAB color values 10, 20, 40 and 50. These device-independent LAB color values are therefore included in the output color management profile 14 as well and are associated therein with the respective device-specific RGB color values as specified by the production device profile 11. Hence, in the example of FIG. 8, the output color management profile is populated with the color value associations 10↔A, 20↔B, 40↔D and 50↔E.

On the other hand, the reference device profile 12 associates some LAB color values to device-specific RGB color values which are not defined and not associated in the production device profile, namely LAB color values 5, 30 and 60. In order to enable the production device to reproduce these LAB color values as similar as possible to the reference device, these LAB color values are mapped by the out-of-gamut mapping to device-specific color values within the gamut of the production device. Hence, the output color management profile specifies the further color value associations 5↔A, 30↔K and 604↔G.

A, K and G are device-specific color values of the production device within the gamut of the production device which are associated with device-independent color values close to the respective device-independent color values referenced in the reference device profile (LAB=10 associated with RGB=A in the production device profile is considered to be close LAB=5 defined by the reference device profile so that the output color management profile associates LAB=5 with RGB=A; LAB=35 associated with RGB=K in the production device profile is considered to be close LAB=30 defined by the reference device profile so that the output color management profile associates LAB=30 with RGB=K; LAB=55 associated with RGB=G in the production device profile is considered to be close LAB=60 defined by the reference device profile so that the output color management profile associates LAB=60 with RGB=G).

Furthermore, the output color management profile 14 of FIG. 8 additional indicates which color value association originates from the production device profile 11 and which color value association results from the out-of-gamut mapping. In the indication of FIG. 8, this is done by the third column labelled "OoG" (briefly for "Out-of-Gamut") which specifies respective flags, 1 indicating out-of-gamut and 0 indicating identity with the production device profile. This enables e.g. the image-related gamut check based on the output color management profile 14 as described above.

The effect of establishing and applying the output color management profile as described above can be shown by the following two tests. A first printer printing on self-adhesive vinyl was chosen to be the production device. The reference device is a Euroscale press standard.

According to the first test, the color spaces of both, the production device and the reference device are then sampled by generating a respective 625 points sampling of their SWOP color spaces in LAB format. The actual colors produced by each one of the two devices are evaluated using their respective device profiles and color distance metrics (average and 95 percentile, i.e. the color distance (dE) value below which 95% of the dE values lie) between both device profiles are computed. In the test performed, the average color distance between both device were 3.45 $dE_{00}$ in average and 5.13 $dE_{00}$ for the 95 percentile metrics.

For the second test, the output color management profile for the first printer printing on self-adhesive vinyl was generated according to the methodologies above in order to enable the first printer to reproduce a similar color appearance as the Euroscale press. Again, the colors produced for the 625 points sampling using the newly generated output color management profile for the first printer is evaluated and the two color distance metrics were again established for the colors produced by applying the new color management profile for the first printer and the (unchanged) sampling of the Euroscale press. Applying the new color management profile for the first printer reduced the average color distance between both samples to 1.27 $dE_{00}$ and the 95 percentile metric to 2.22 $dE_{00}$.

As color distances below 2 $dE_{00}$ can be considered to be unnoticeable for the usual user, most of the 625 colors produced by the two device in the first test (printed directly by applying the usual device profiles) would be recognized to be different as the average color distance between both samples is almost 3.5 $dE_{00}$. Applying the generated output color management profile for the first printer to emulate the Euroscale press has the effect that most of the colors (almost 95%) are considered to be similar by the usual observer.

Figure 9:
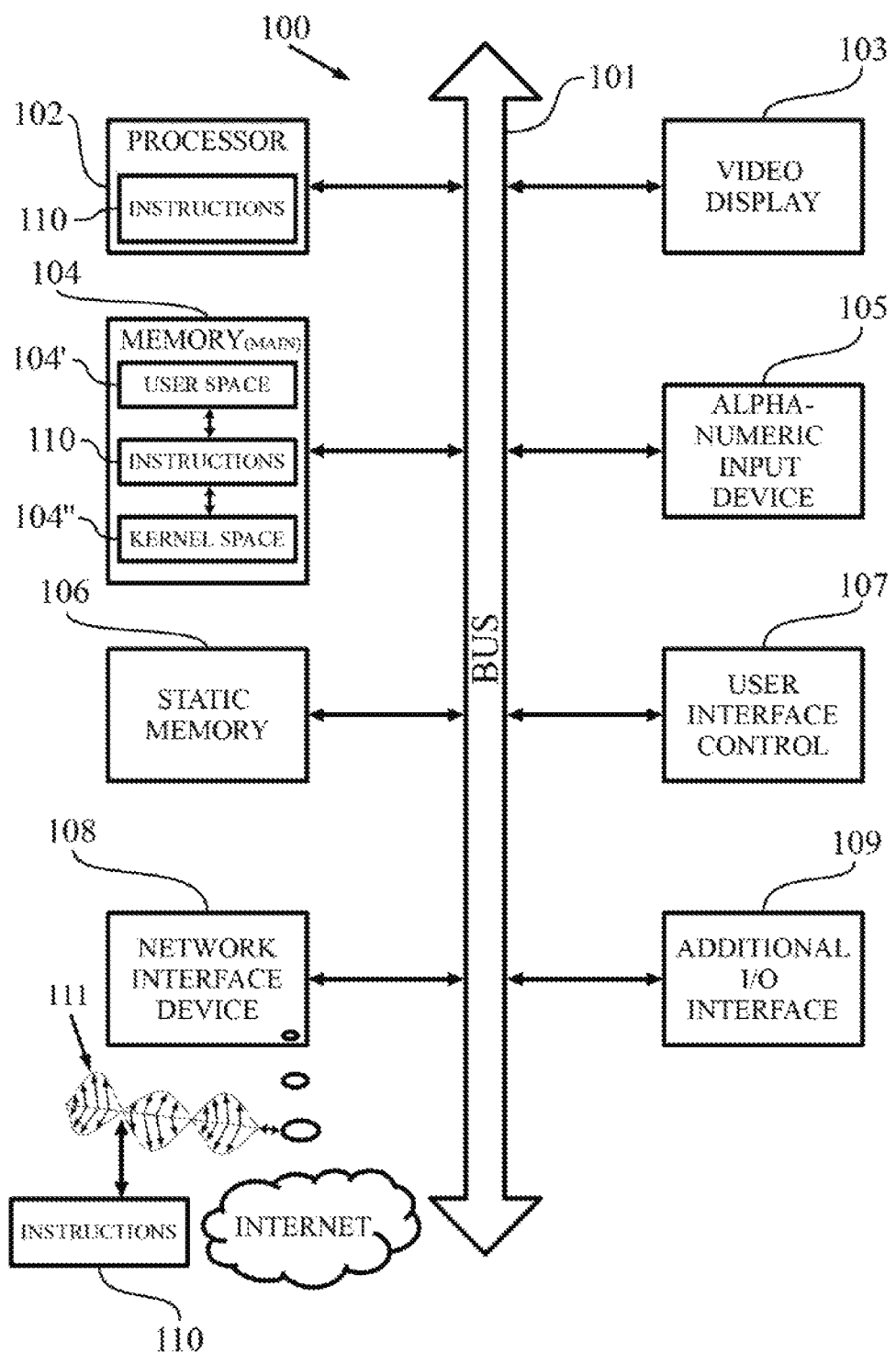
FIG. 9 depicts example components of an example web server implementation.

FIG. 9 is a diagrammatic example representation of a computer system 100 arranged as a web server 3 to execute a set of instructions, to cause the computer system 100 to perform any of the methodologies implementing the web-service-based output color management profile generation as described above. The computer system 100 includes a processor 102, a main memory 104 and a network interface 108 which communicate with each other via a bus 101. The computer system 100 further includes a static memory 106, e.g. non-removable flash and/or solid state drive and/or a removable Micro or Mini SD card, which permanently stores the instructions enabling the computer system 100 to execute its functions. Furthermore, the computer system 100 may include a video display 103, a user interface control module 107 and/or an alpha-numeric and cursor input device 105. Additional I/O interfaces 109 such as a card reader and USB interfaces may be present. In some examples, the instructions programmed to carry out the output color management profile generation described herein is stored on the static memory 106. The functionalities of receiving the device profiles and images as well as returning the output color management profile and the warning messages as described above are performed via the network interface device 108.

A machine-readable and executable set of instructions 110 embodying any one, or all, of the methodologies described above, resides completely, or at least partially, permanently in the non-volatile memory 106. When being executed, process data resides in the main memory 104 and/or the processor 102. The instructions 110 may further be transmitted or received as a propagated signal 111 through the network interface device 108 from/to a software server within a local area network or the Internet from where the instructions 110 may be distributed e.g. to further web servers 3.

Although certain products and methods constructed in accordance with the description herein, the scope of coverage of this patent is not limited thereto. On the contrary, this patent covers all examples of the teachings described herein fairly falling within the scope of the appended claims either literally or under the doctrine of equivalents.

The invention claimed is:

1. A method of web server based color management enabling a production device to produce a print job with a similar color appearance as a reference device, the method being performed by a web server hosting a web-service implementing the web server based color management, the method comprising:
    receiving a color management profile of the production device associating device-independent color values and device-specific color values for colors being reproducible by the production device;
    receiving a color management profile of the reference device associating device-independent color values and device-specific color values for colors being reproducible by the reference device;
    performing an abstract gamut check between the color management profile of the production device and the color management profile of the reference device without respect to any particular image to be printed on the production device, the abstract gamut check determining an extent to which the color gamut of the production device does not encompass the color gamut of the reference device;
    in response to the extent to which the color gamut of the production device does not encompass the color gamut of the reference device being greater than a threshold, outputting an out-of-gamut warning;
    creating an output color management profile based on the color management profile of the production device and the color management profile of the reference device, the output color management profile mapping device-independent color values associated in the color management profile of the reference device to device-specific color values for colors reproducible by the production device; and
    returning the output color management profile.

2. The method according to claim 1, wherein the output color management profile specifies a mapping of all colors of the color space of the reference device to colors being reproducible by the production device.

3. The method according to claim 1, wherein the output color management profile specifies the same device-specific color values of the color management profile of the production device for all device-independent color values associated in the color management profile of the reference device and in the color management profile of the production device.

4. The method according to claim 1, further comprising:
    performing an out-of-gamut mapping for the device-independent color values associated in the color management profile of the reference device, but not in the color management profile of the production device, wherein the output color management profile maps the device-independent color values associated in the color management profile of the reference device to device-specific color values that are reproducible by the production device.

5. The method according to claim 1, further comprising:
    performing an image-specific gamut check on the basis of an image to be reproduced by the print job uploaded to the web server, the image-specific gamut check determining an extent to which the color gamut of the production device does not encompass the color gamut of the reference device as to the image to be reproduced by the print job; and
    in response to the extent to which the color gamut of the production device does not encompass the color gamut of the reference device as to the image to be reproduced by the print job being greater than the threshold, outputting the out-of-gamut warning.

6. The method according to claim 1, wherein the color management profile of at least one reference device is a reference color management profile according to an industry standard, in particular Fogra or GRACol.

7. A web server for server based color management enabling a production device to produce a print job with a similar color appearance as a reference device, wherein the web server is to:
    receive a color management profile of the production device associate device-independent color values and device-specific color values for colors being reproducible by the production device;
    receive a color management profile of the reference device associate device-independent color values and device-specific color values for colors being reproducible by the reference device;
    perform an abstract gamut check between the color management profile of the production device and the color management profile of the reference device without respect to any particular image to be printed on the production device, the abstract gamut check determining an extent to which the color gamut of the production device does not encompass the color gamut of the reference device;
    in response to the extent to which the color gamut of the production device does not encompass the color gamut of the reference device being greater than a threshold, outputting an out-of-gamut warning;
    create an output color management profile based on the color management profile of the production device and the color management profile of the reference device, the output color management profile mapping device-independent color values associated in the color management profile of the reference device to device-specific color values for colors reproducible by the production device; and return the output color management profile.

8. The web server according to claim 7, wherein the web server is to create the output color management profile by mapping all colors of the color space of the reference device to colors being reproducible by the production device.

9. The web server according to claim 7, wherein the output color management profile specifies the same device-specific color values of the color management profile of the production device for all device-independent color values associated in the color management profile of the reference device and in the color management profile of the production device.

10. The web server according to claim 7, wherein the web server is further to:

perform an image-specific gamut check on the basis of an image to be reproduced by the print job uploaded to the web server, the image-specific gamut check determining an extent to which the color gamut of the production device does not encompass the color gamut of the reference device as to the image to be reproduced by the print job; and in response to the extent to which the color gamut of the production device does not encompass the color gamut of the reference device as to the image to be reproduced by the print job being greater than the threshold, outputting the out-of-gamut warning.

11. The web server according to claim 7, wherein the color management profile of the reference device is a reference color management profile according to an industry standard, in particular Fogra or GRACol.

12. A computer program product comprising:

a non-transitory computer readable medium; and computer program instructions stored on the non-transitory computer readable medium that upon execution by a processor of a web server for web-service-based color management enabling a production device to produce a print job with a similar color appearance as a reference device cause the web server to:

receive a color management profile of the production device;

receive a color management profile of the reference device;

perform an abstract gamut check between the color management profile of the production device and the color management profile of the reference device without respect to any particular image to be printed on the production device, the abstract gamut check determining an extent to which the color gamut of the production device does not encompass the color gamut of the reference device;

in response to the extent to which the color gamut of the production device does not encompass the color gamut of the reference device being greater than a threshold, outputting an out-of-gamut warning;

create an output color management profile based on the color management profile of the production device and the color management profile of the reference device, the output color management profile specifying device-specific color values for colors being reproducible by the production device that produce similar colors as the color produced by corresponding device-specific color values specified by the reference device profile; and return the output color management profile.

13. The computer program product of claim 12, wherein the computer program instructions, upon execution by the processor of the web server, further cause the web server to:

perform an out-of-gamut mapping for the device-independent color values associated in the color management profile of the reference device, but not in the color management profile of the production device, wherein the output color management profile maps the device-independent color values associated in the color management profile of the reference device to device-specific color values that are reproducible by the production device.

14. The computer program product of claim 12, wherein the computer program instructions, upon execution by the processor of the web server, further cause the web server to:

perform an image-specific gamut check on the basis of an image to be reproduced by the print job uploaded to the web server, the image-specific gamut check determining an extent to which the color gamut of the production device does not encompass the color gamut of the reference device as to the image to be reproduced by the print job; and in response to the extent to which the color gamut of the production device does not encompass the color gamut of the reference device as to the image to be reproduced by the print job being greater than the threshold, outputting the out-of-gamut warning.

\* \* \* \* \*